(12) United States Patent
Schmidt et al.

(10) Patent No.: US 10,086,314 B2
(45) Date of Patent: Oct. 2, 2018

(54) FLUID STORAGE RESERVOIR WITH FLOW DYNAMIC FLUID MANAGEMENT AND HYDRONUCLEATION

(71) Applicants: Mark Schmidt, Jackson, WI (US); Robert E. Broman, Mequon, WI (US)

(72) Inventors: Mark Schmidt, Jackson, WI (US); Robert E. Broman, Mequon, WI (US)

(73) Assignee: Helgesen Industries, Inc., Hartford, WI (US)

( * ) Notice: Subject to any disclaimer, the term of this patent is extended or adjusted under 35 U.S.C. 154(b) by 126 days.

(21) Appl. No.: 15/066,878

(22) Filed: Mar. 10, 2016

(65) Prior Publication Data
US 2016/0271524 A1    Sep. 22, 2016

Related U.S. Application Data

(60) Provisional application No. 62/135,416, filed on Mar. 19, 2015, provisional application No. 62/272,350, filed on Dec. 29, 2015.

(51) Int. Cl.
*B01D 19/00* (2006.01)

(52) U.S. Cl.
CPC ..... *B01D 19/0031* (2013.01); *B01D 19/0042* (2013.01)

(58) Field of Classification Search
CPC ..................... B01D 19/00–19/0495
USPC ............. 210/167.21–167.27, 247; 95/262
See application file for complete search history.

(56) References Cited

U.S. PATENT DOCUMENTS

| 634,897 | A | * | 10/1899 | Martin | B01D 29/05 137/545 |
| 3,133,292 | A | * | 5/1964 | Spier | A47K 3/002 4/580 |
| 3,747,302 | A | | 7/1973 | Frayssinoux | |
| 4,385,989 | A | * | 5/1983 | Margolis | A01K 63/045 210/167.24 |
| 4,878,924 | A | * | 11/1989 | Yano | B01D 19/0057 210/167.04 |
| 6,402,821 | B1 | | 6/2002 | Matsuyama | |
| 6,447,679 | B1 | | 9/2002 | Watari et al. | |
| 2007/0017366 | A1 | | 1/2007 | Wu et al. | |

(Continued)

FOREIGN PATENT DOCUMENTS

| CN | 101184422 A | 5/2008 |
| CN | 101484227 A | 7/2009 |

(Continued)

*Primary Examiner* — T. Bennett McKenzie
(74) *Attorney, Agent, or Firm* — Reinhart Boerner Van Deuren P.C.

(57) ABSTRACT

A fluid storage reservoir including a reservoir body and a filtration unit is provided. The reservoir body defines an internal cavity, an inlet and at least one outlet. The filtration unit is fluidly interposed between the inlet and at least one outlet of the reservoir body. The filtration unit includes a dispersion mechanism and a filter. The dispersion mechanism is positioned within the internal cavity. The filter is in fluid communication with the inlet and located within the dispersion mechanism. Fluid exiting the filtration unit passes through the dispersion mechanism as the fluid passes into a primary storage region of the internal cavity surrounding the filtration unit.

8 Claims, 4 Drawing Sheets

(56) References Cited

U.S. PATENT DOCUMENTS

| | | | |
|---|---|---|---|
| 2011/0162335 A1* | 7/2011 | Frei | A47L 5/36 |
| | | | 55/372 |
| 2011/0284089 A1 | 11/2011 | Knuth | |
| 2012/0192799 A1* | 8/2012 | Bazemore, Sr. | A01K 63/006 |
| | | | 119/264 |
| 2013/0146524 A1 | 6/2013 | Veit et al. | |

FOREIGN PATENT DOCUMENTS

| | | |
|---|---|---|
| CN | 103260719 A | 8/2013 |
| DE | 1 766 588 A1 | 8/1971 |
| FR | 643 119 A | 9/1928 |

\* cited by examiner

FLUID STORAGE RESERVOIR WITH FLOW DYNAMIC FLUID MANAGEMENT AND HYDRONUCLEATION

CROSS-REFERENCE TO RELATED PATENT APPLICATIONS

This patent application claims the benefit of U.S. Provisional Patent Application No. 62/135,416, filed Mar. 19, 2015 and U.S. Provisional Patent Application No. 62/272,350, filed Dec. 29, 2015, the entire teachings and disclosure of which are incorporated herein by reference thereto.

FIELD OF THE INVENTION

This invention generally relates to fluid storage reservoirs and particularly fluid storage reservoirs configured to reduce the entrainment of air into the fluid stored within the fluid storage reservoirs.

BACKGROUND OF THE INVENTION

Many machines use fluids for operation. For instance, many tractors, trucks, or other types of mobile equipment often include hydraulic systems for powering and controlling systems controlled by the machine. Hydraulic cylinders as well as transmissions are two examples of such systems.

Through use of the machine and systems, the fluid may become impure with particulates as well as entrained air. The inclusion of the impurities in the fluid can have detrimental effects on the operation of the systems as well as potentially damage the systems that utilize the fluid. For instance, the inclusion of impurities, such as entrained air, can cause a system to have less responsiveness to changes in pressure of the fluid. Further, the impurities can cause breakdown of the components of the system or block fluid flow passages.

BRIEF SUMMARY OF THE INVENTION

Embodiments of the present invention relate to a new and improved fluid storage reservoir. More particularly, embodiments of the present invention relate to a new and improved fluid storage reservoir that includes all fluid in one primary fluid region.

In some embodiments, a filtration unit is also located within the primary fluid region. The system may include components and configurations for reducing the velocity of the fluid to promote hydronucleation, i.e. removal of entrained air from the fluid.

In one embodiment, a fluid storage reservoir including a reservoir body and a filtration unit is provided. The reservoir body defines an internal cavity, an inlet and at least one outlet. The filtration unit is fluidly interposed between the inlet and at least one outlet of the reservoir body. The filtration unit includes a dispersion mechanism and a filter. The dispersion mechanism is positioned within the internal cavity. The filter is in fluid communication with the inlet and located within the dispersion mechanism. Fluid exiting the filtration unit passes through the dispersion mechanism as the fluid passes into a primary storage region of the internal cavity surrounding the filtration unit.

In a particular embodiment, the dispersion mechanism is in the form of a cone in which the filter is located. Fluid exits the cone through an annular gap defined between an outer periphery of the filter and an inner surface of the cone.

In a particular embodiment, a first cross-sectional area of the inlet is smaller than a second cross-sectional area defined by the gap formed between the inner surface of the cone and the outer periphery of the filter so as to allow for fluid velocity to decrease.

In a particular embodiment, the cone gets larger in diameter when moving from a direction extending from a bottom of the reservoir body toward a top of the reservoir body.

In a particular embodiment, at least one fluid outlet is located proximate a bottom of the reservoir body.

In a particular embodiment, the outlet is vertically below an open outlet end of the cone such that the fluid must flow vertically downward toward the outlet after exiting the cone.

In a particular embodiment, the second cross-sectional area is at least 10% greater than the first cross-sectional area.

In a particular embodiment, the outlet is in direct fluid communication with the primary storage region.

In a particular embodiment, the dispersion mechanism is a perforated tube including a plurality of apertures extending therethrough. The perforated tube surrounds the filter. The perforated tube is interposed between the filter and the at least one outlet.

In a particular embodiment, a first cross-sectional area of the inlet is smaller than a second cross-sectional area defined by the combined cross-sectional area of the plurality of apertures so as to allow for fluid velocity to decrease from a velocity passing through the inlet and a velocity exiting the perforated tube and entering the primary storage region.

In a particular embodiment, fluid does not enter the primary storage region from the filtration unit through the perforated tube in a single stream of fluid.

In a particular embodiment, the apertures of the perforated tube are distributed around a central axis of the perforated tube such that fluid exits the perforated tube substantially uniformly around the central axis.

In one embodiment, a method of storing fluid is provided. The method includes receiving fluid into an internal cavity of a reservoir body having an inlet and at least one outlet through the inlet. The method includes filtering the fluid with a filter of a filtration unit fluidly interposed between the inlet and at least one outlet of the reservoir body. The filter is positioned within a dispersion mechanism. The method includes passing the fluid through the dispersion mechanism within the internal cavity as the fluid passes into a primary storage region of the internal cavity surrounding the filtration unit.

In a particular embodiment, the dispersion mechanism is in the form of a cone in which the filter is located. Fluid exits the cone through an annular gap defined between an outer periphery of the filter and an inner surface of the cone.

In a particular embodiment, a first cross-sectional area of the inlet is smaller than a second cross-sectional area defined by the gap formed between the inner surface of the cone and the outer periphery of the filter so as to allow for fluid velocity to decrease.

In a particular embodiment, the cone gets larger in diameter when moving from a direction extending from a bottom of the reservoir body toward a top of the reservoir body.

In a particular embodiment, the dispersion mechanism is a perforated tube including a plurality of apertures extending therethrough. The perforated tube surrounds the filter. The perforated tube is interposed between the filter and the at least one outlet.

In a particular embodiment, a first cross-sectional area of the inlet is smaller than a second cross-sectional area defined by the combined cross-sectional area of the plurality of apertures so as to allow for fluid velocity to decrease from a velocity passing through the inlet and a velocity exiting the perforated tube and entering the primary storage region.

In a particular embodiment, fluid does not enter the primary storage region from the filtration unit through the perforated tube in a single stream of fluid.

In a particular embodiment, the apertures of the perforated tube are distributed around a central axis of the perforated tube such that fluid exits the perforated tube substantially uniformly around the central axis.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
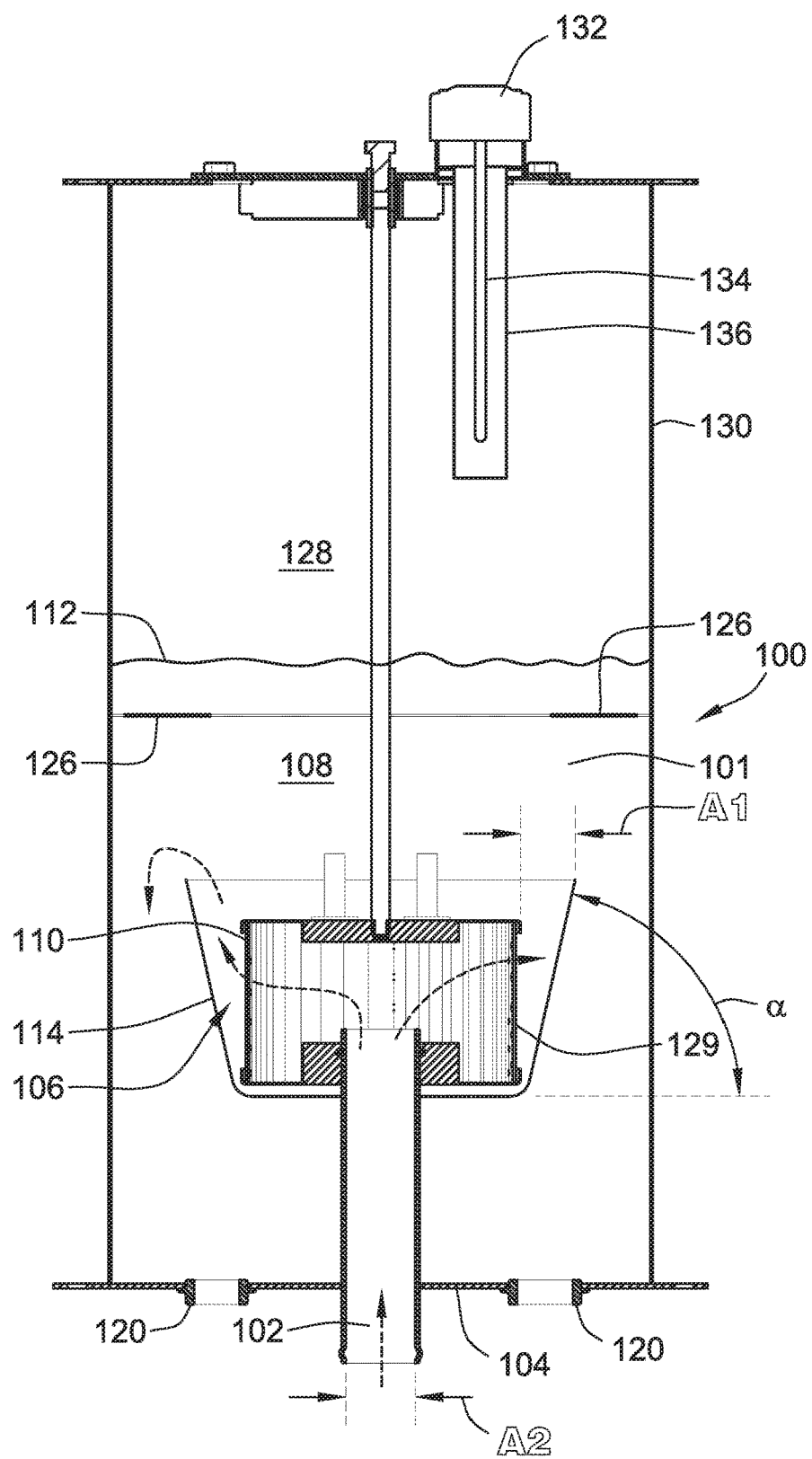
FIG. 1 is a simplified cross-sectional illustration of a fluid storage reservoir according to an embodiment of the invention.
Figure 2:
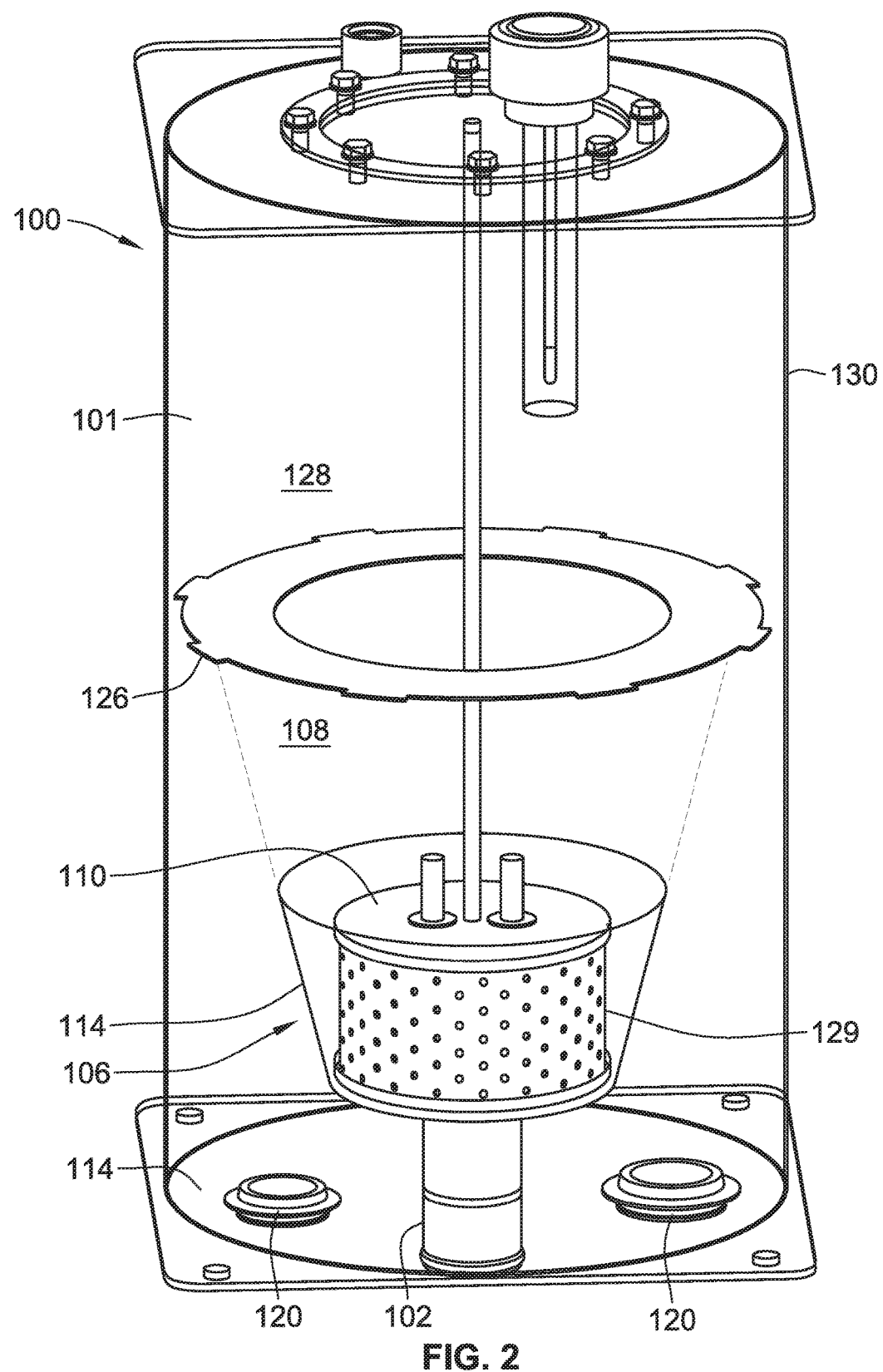
FIG. 2 is a simplified illustration of the fluid storage reservoir of FIG. 1 with the sidewall being shown as transparent to illustrate the internal components.

FIG. 1 is a simplified illustration of an embodiment of a fluid storage reservoir 100 according to the teachings of the present invention. The fluid storage reservoir 100 is configured to store a fluid for use by a downstream system. In a particular embodiment, the fluid storage reservoir 100 is configured to be a fluid storage reservoir 100 for storing hydraulic fluid.

The fluid storage reservoir 100 defines an internal cavity 101 and has an inlet 102 in operable fluid communication with the internal cavity 101. Fluid enters the internal cavity 101 proximate, and preferably through, a bottom 104 of the fluid storage reservoir 100. In the illustrated embodiment, the inlet 102 is in the form of a barb return port that can be operably coupled to a return line of the system. Other coupling mechanisms are contemplated A filtration unit 106 is located within a primary fluid storage region 108 of the internal cavity 101. Dirty fluid returning to the fluid storage reservoir 100 enters the fluid storage reservoir 100 through the inlet 102. The dirty fluid will first enter an interior of a filter 110 of the filtration unit 106 defined by filtration media of the filter 110. The dirty fluid will pass through the filter 110 prior to entering into the primary fluid storage region 108 of the fluid storage reservoir 100. This is an in-to-out fluid flow where the fluid flows radially outward through the filter 110.

The fluid leaves the filtration unit 106 and flows upward toward a fluid-to-air interface 112 (e.g. towards plate 126). The fluid is directed upwards by an inner surface of a dispersion mechanism in the form of cone 114. The angle α of the cone corresponds to the cross sectional area of the inlet to control the velocity of the fluid as it leaves the filter 110 so as to define an appropriate outlet region between the outer periphery of the filter 110 and the inner surface of cone 114. As discussed more fully below, the angle α is generally selected such that the outlet region has a cross-sectional area A1 that is 10-30% greater than the cross-sectional area A2 of the inlet 102.

The cone 114 generally surrounds the filter 110 such that the outlet region between the filter 110 and the inner surface is generally continuous in a continuous annular band surrounding the filter 110. This configuration, including the taper of the inner surface of the cone 114 allows for an even conical flow of fluid flowing toward the fluid-to-air interface 112 exiting the cone 114, illustrated in schematic form by dashed lines.

After exiting the cone 114, the fluid changes flow direction and flows toward the bottom 104 of the reservoir 100 to the outlet(s) 120 in the form of suction ports. The change in flow direction or deceleration facilitates hydronucleation and release of air molecules that are entrained within the fluid.

The filtration unit 106 acts as a diffuser and reduces the velocity of the fluid as it enters the primary fluid region 108. The cross-sectional area A1 of the outlet region between the cone 114 and the filter 110 is larger than the cross-sectional area A2 of the inlet 102. Preferably, the cross-sectional area A1 is at least 10% greater, more preferably 20% greater and may be 30% greater than the area A2. In some embodiments, area A1 may be 100% greater than tare A2 The increase in area between the cone 114 and filter 110 causes the fluid velocity to decelerate. This deceleration helps with hydronucleation and the release of air molecules that are entrained within the fluid.

This is unlike prior designs where the filtration unit is typically a separate housing within the reservoir that defines a filter exit tube. Many times, the filter exit tube has a smaller cross-sectional area than the inlet 102 causing the fluid to accelerate as it enters the general storage volume of the reservoir. It can be appreciated that this acceleration can promote turbulence and entrainment of air. Further yet, as the housing uses an exit tube, the fluid exits in a single stream directed together increasing currents within the reservoir. The diffusive properties of the outlet region of the embodiment help prevent turbulent currents within the reservoir 100.

In addition to acting as a diffuser, the filter 110 itself also decelerates the fluid velocity to further help with hydronucleation.

A wave suppression plate 126 separates the internal cavity 101 into primary fluid region 108 and excess region 128. The wave suppression plate 126 inhibits fluid turbulence or sloshing at the fluid-to-air interface 112. This inhibits entrainment of air into the fluid.

Thus, the filtration unit 106 and configuration thereof provides for hydronucleation to remove entrained air from the fluid. In the illustrated embodiment, the filter 110 includes an outer plate 129 that includes a plurality of holes that can also promote hydronucleation of entrained air as the fluid pass therethrough. It is preferred that the combined cross-sectional area of the holes in the outer plate 129 of the filter 110 is greater than the cross-sectional area A2 of the inlet such that the fluid is not required to accelerate as it passes through the holes.

By removing entrained air, the overall volume of fluid (i.e. mixed fluid and air), is reduced allowing for the fluid storage reservoir 100 to be reduced in size. Also, removal of entrained air can assist in the responsiveness of the system that utilizes the fluid.

The outer wall 130 of the fluid storage reservoir 100 is preferably round or oval. By including the wave suppression plate 126, the wall thickness of the outer wall 130 may be reduced due to the structural strength provided thereby.

The fluid storage reservoir 100 may be formed from steel, aluminum and/or nonmetallic materials.

The reservoir is configured to be scalable such that the desired tank size can be adjusted due to the storage capacities required for the system.

Additionally, the reservoir design is flexible in that different filter media may be used without changing the reservoir geometry.

The fluid storage reservoir 100 includes a breather fill cap 132 with a fluid level dip stick 134 that is surrounded by a fill strainer basket 136 for straining the fluid for initial filling of the system with fluid.

The decelerations identified above provided, in part, by the dispersion mechanism also reduces the speed of the fluid as it is directed toward the fluid-to-air interface 112 which helps prevent turbulence and entrainment of air at the interface 112. The deceleration of the fluid helps reduce turbulence kinetic energy. One way to reduce turbulence kinetic energy in the past was to increase the size of the reservoir and the amount of fluid stored therein, however, this increases weight and cost.

The number of times a fluid is cycled through a system is referred to as tank turns. Tank turns are a measure of fluid flow rate vs. tank volume. For example, a 100 gallon tank subjected to 100 gallons/minute flow rate has 1 turn/minute. However, if the tank size is reduced to say 20 gallons and the flow rate stays the same, as this is typically a function of the connected systems, the fluid will have to turn 5 times per minute significantly increasing the turbulence kinetic energy within the fluid stored within the fluid reservoir 100. The present invention reduces the amount of turbulence kinetic energy which allows for increased number of tank turns such that the volume of the reservoir can be reduced without undesirably increasing the amount of turbulence kinetic energy or the potential for increased entrainment of air. The present concepts will find particular use in tanks having a volume of between 5 and 300 gallons that are used with systems that are exposed to tank turns of between 3 and 20 turns/minute and more preferably between 5 and 15 turns/minute.

Figure 3:
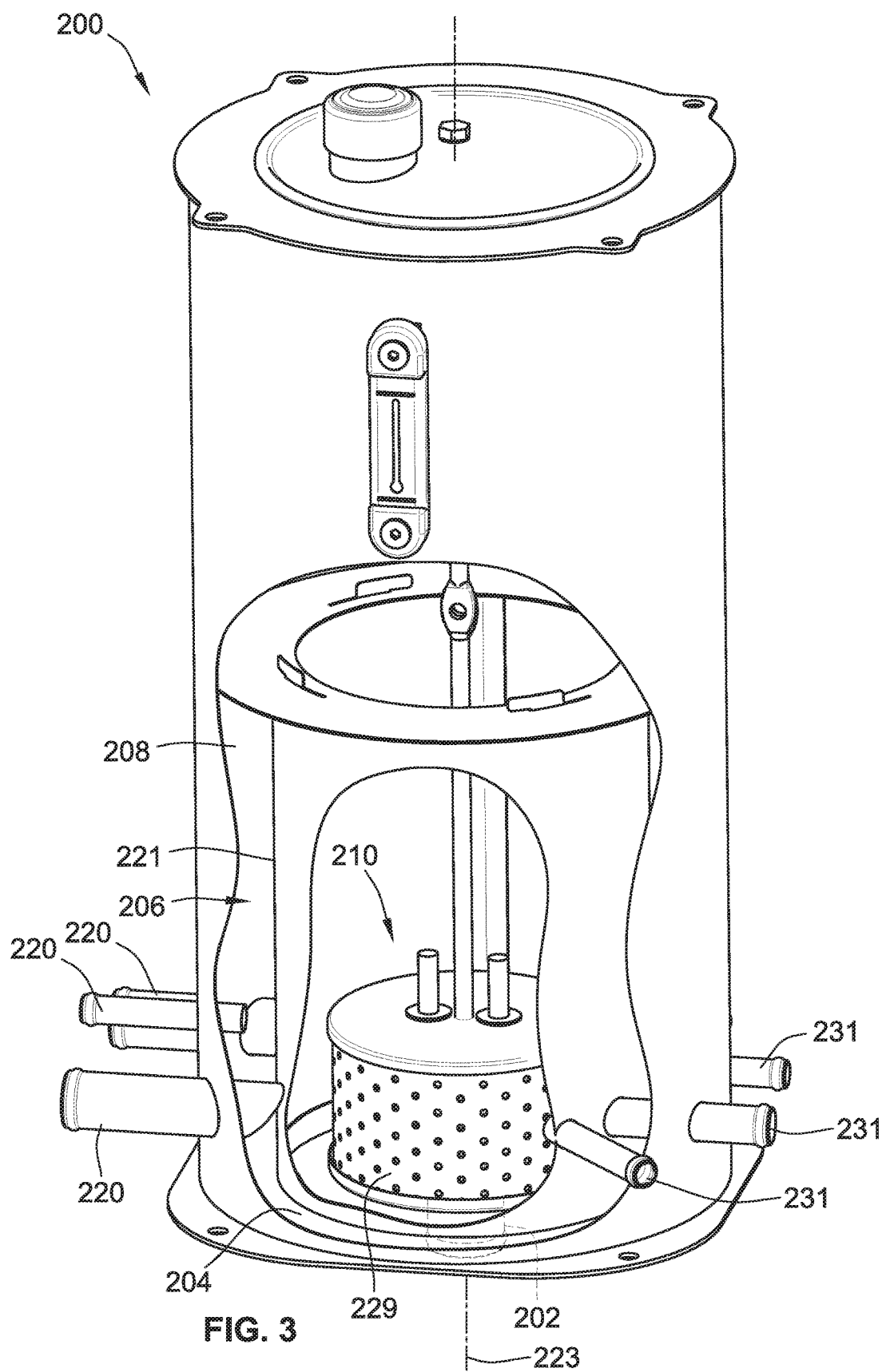
FIG. 3 is a simplified illustration of a fluid storage reservoir according to an embodiment of the invention with the sidewall and perforated tube shown as transparent to illustrate additional internal components.
Figure 4:
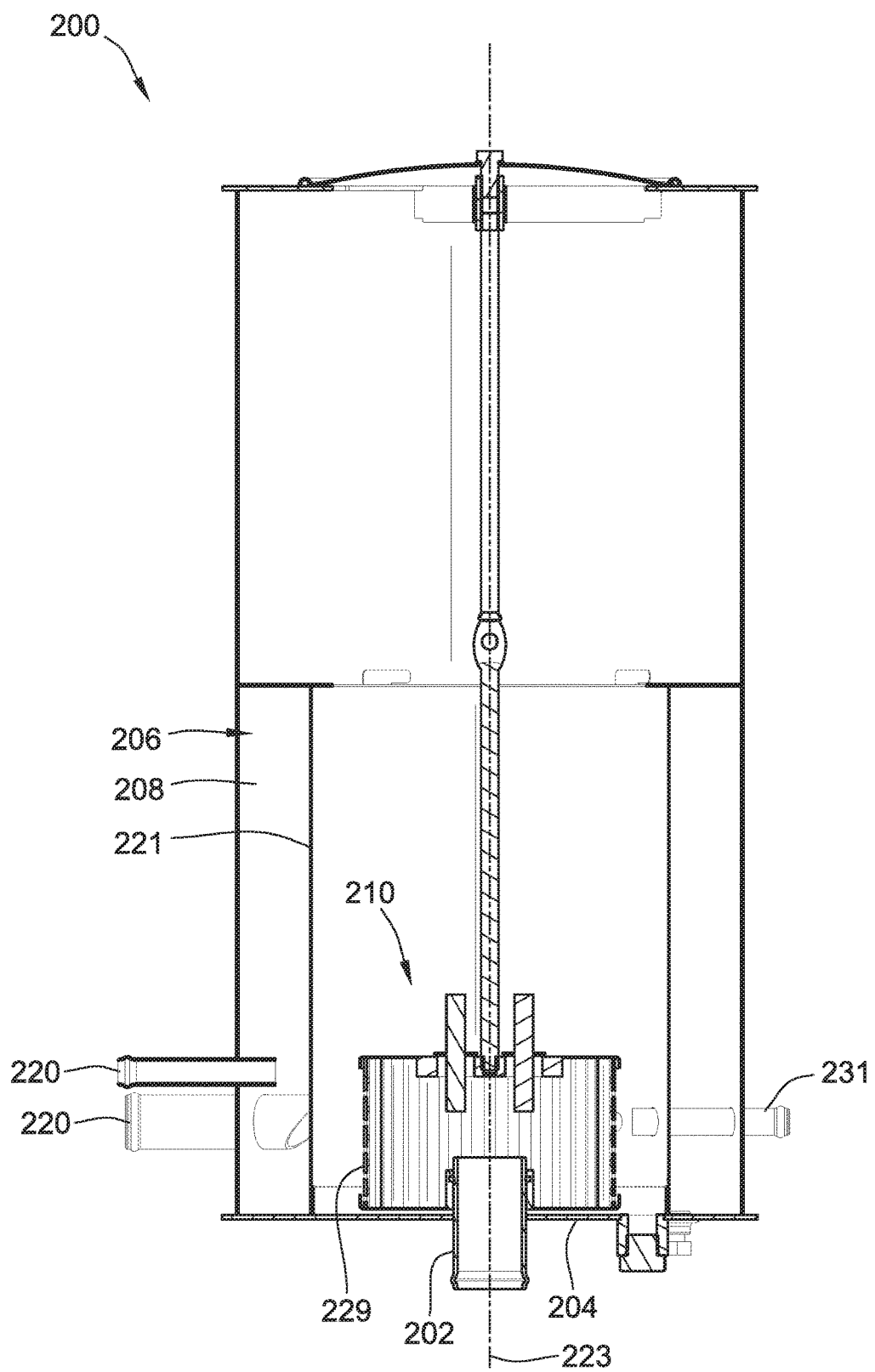
FIG. 4 is a simplified cross-sectional illustration of the fluid storage reservoir of FIG. 3.

FIG. 3 and are simplified illustrations of a further embodiment of a fluid storage reservoir 200. The fluid storage reservoir 200 has many similar features to the prior embodiment and is also focused on reducing the amount of entrained air as well as turbulence kinetic energy of the fluid stored therein such that the volume of the fluid storage region 208 can be reduced without an increase in entrained air.

The fluid storage reservoir 200 again has an inlet 202 that extends through a bottom 204 of the outer peripheral housing of the fluid storage reservoir 200. A plurality of outlet ports where fluid is removed from the fluid storage region 208.

A filtration unit 206 is housed within the fluid storage region 208. Again, a filter storage housing with an exit tube is not provided. This embodiment again continues to decelerate the flow of fluid as it exits the inlet port 202, passes through the filtration unit 206 and then ultimately back to outlet ports 220

Rather than including a dispersion mechanism in the form of cone 114 in the prior embodiment, the filtration unit 206 includes a dispersion mechanism in the form of a perforated tube 221 which may be sheet metal having a plurality of apertures, a screen, etc. The perforated tube 221 surrounds the filter 210 as well as a central axis 223. The cross-sectional area of the apertures within the perforated tube 221 is greater than the cross-sectional area of the inlet 202 to prevent acceleration of the fluid as it passes through the perforated tube 221. The combined cross-sectional area of the apertures in the perforated tube 221 may be 10%, 20%, 30%, 100%, or 200% greater than the area of the inlet 202 depending on the implementation.

The apertures are preferably substantially evenly spread around the entire filter 210 and central axis 223 such there are apertures through the perforated tube 221 entirely around the filter 210. Again, this promotes substantially uniform dispersion of the fluid as it enters the storage region 208 surrounding the filtration unit 206.

Again, the filter 210 includes an outer plate 229 that includes a plurality of holes as well. Ideally, the combined cross-sectional area of the plurality of holes in the outer plate 229 is greater than the cross-sectional area of the inlet 202 but equal to or less than the combined cross-sectional area of the apertures in the perforated tube 221.

Again, by eliminating the filtration unit housing with a focused exit tube, the fluid is allowed to disperse in substantially all directions around the filtration unit 206 such that a focused stream of fluid acting like a jet of fluid is not entering the storage region 208 as in prior systems. This is true both as the fluid exits filter 210 as well as perforated tube 221.

Due to the low pressure generated by this configuration, the system also includes a plurality of low pressure return ports 231 that return fluid into the region formed between the inner surface of perforated tube 221 and the outer periphery of the filter 210. These return ports 231 may return fluid that is at a very low pressure that is not desirable to be combined with the higher pressure fluid entering the storage reservoir 200 through inlet 202 such as fluid that is used to lubricate bearings. This is particularly true where it is undesirable for the low pressure fluid that is being used for a particular purpose to have back pressure which could result if it was combined with the fluid that is entering through inlet 202. The perforated tube 221 can help provide a level of filtration for that low pressure fluid.

While the perforated tube 221 is illustrated as being circular in cross-section, other embodiments could utilize other shapes such as rectangular, triangular, oval, obround, etc.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid storage reservoir comprising:
   a reservoir body defining an internal cavity and an inlet and at least one outlet;
   a filtration unit fluidly interposed between the inlet and at least one outlet of the reservoir body, the filtration unit including:
      a dispersion mechanism within the internal cavity, the dispersion mechanism defining an outlet region;
      a filter in fluid communication with the inlet and located within the dispersion mechanism, fluid exiting the filtration unit passing through the outlet region of the dispersion mechanism as the fluid passes into a primary storage region of the internal cavity surrounding the filtration unit, the dispersion mechanism directing the fluid upwards towards a fluid-to-air interface located vertically above the dispersion mechanism through the outlet region after the fluid exits the filter;
   the at least one outlet of the reservoir body located vertically below the outlet region of the dispersion mechanism such that the fluid must flow vertically upward to exit the dispersion mechanism and then vertically downward toward the at least one outlet after exiting the dispersion mechanism; and
   wherein the dispersion mechanism is in the form of a cone in which the filter is located, fluid exiting the cone through the outlet region, the outlet region formed by an annular gap defined between an outer periphery of the filter and an inner surface of the cone.

2. The fluid storage reservoir of claim 1, wherein a first cross-sectional area of the inlet is smaller than a second cross-sectional area defined by the gap formed between the inner surface of the cone and the outer periphery of the filter so as to allow for fluid velocity to decrease.

3. The fluid storage reservoir of claim 1, wherein the cone gets larger in diameter when moving from a direction extending from a bottom of the reservoir body toward a top of the reservoir body, the at least one outlet being positioned proximate the bottom of the reservoir body, the outlet region being positioned vertically between the bottom of the reservoir body and the top of the reservoir body, the fluid-to-air interface being located between the top of the reservoir body and the outlet region.

4. The fluid storage reservoir of claim 2, wherein the second cross-sectional area is at least 10% greater than the first cross-sectional area.

5. The fluid storage reservoir of claim 1, wherein the outlet is in direct fluid communication with the primary storage region.

6. A method of storing fluid comprising:
   receiving fluid into an internal cavity of a reservoir body having an inlet and at least one outlet through the inlet;
   filtering the fluid with a filter of a filtration unit fluidly interposed between the inlet and at least one outlet of the reservoir body, the filter being positioned within a dispersion mechanism, the dispersion mechanism defining an outlet region; and
   passing the fluid through the dispersion mechanism within the internal cavity as the fluid passes into a primary storage region of the internal cavity surrounding the filtration unit;
   directing, with the dispersion mechanism, the fluid upwards toward a fluid-to-air interface through the outlet region after the fluid exits the filter; and
   directing the fluid downwards towards the at least one outlet of the reservoir body which is located vertically below the outlet region of the dispersion mechanism after the fluid exits the dispersion mechanism; and
   wherein the dispersion mechanism is in the form of a cone in which the filter is located, fluid exits the cone through the outlet region, the outlet region formed by an annular gap defined between an outer periphery of the filter and an inner surface of the cone.

7. The method of claim 6, wherein a first cross-sectional area of the inlet is smaller than a second cross-sectional area defined by the gap formed between the inner surface of the cone and the outer periphery of the filter so as to allow for fluid velocity to decrease.

8. The method of claim 6, wherein the cone gets larger in diameter when moving from a direction extending from a bottom of the reservoir body toward a top of the reservoir body, the at least one outlet being positioned proximate the bottom of the reservoir body, the outlet region being positioned vertically between the bottom of the reservoir body and the top of the reservoir body, the fluid-to-air interface being located between the top of the reservoir body and the outlet region.

* * * * *